US007158537B2

(12) United States Patent
Bender et al.

(10) Patent No.: US 7,158,537 B2
(45) Date of Patent: *Jan. 2, 2007

(54) METHOD AND APPARATUS FOR PROVIDING CONFIGURABLE LAYERS AND PROTOCOLS IN A COMMUNICATIONS SYSTEM

(75) Inventors: Paul E. Bender, San Diego, CA (US); Gadi Karmi, Solana Beach, CA (US); Bibhu Mohanty, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 749 days.

This patent is subject to a terminal disclaimer.

(21) Appl. No.: 10/335,593

(22) Filed: Dec. 30, 2002

(65) Prior Publication Data

US 2003/0118049 A1 Jun. 26, 2003

Related U.S. Application Data

(63) Continuation of application No. 09/499,196, filed on Feb. 7, 2000, now Pat. No. 6,539,030.

(51) Int. Cl.
*H04J 3/16* (2006.01)
(52) U.S. Cl. .................... 370/469; 370/466; 375/130
(58) Field of Classification Search ............... None
See application file for complete search history.

(56) References Cited

U.S. PATENT DOCUMENTS 4,901,307 A 2/1990 Gilhousen et al.
5,103,459 A 4/1992 Gilhousen et al.
5,267,244 A 11/1993 Messerschmitt et al.
5,446,736 A 8/1995 Gleeson et al.
5,818,871 A 10/1998 Blakeney, II et al.
6,011,796 A 1/2000 Rezaiifar et al.
6,188,898 B1 2/2001 Phillips
6,314,101 B1 11/2001 Rezaiifar et al.
6,539,030 B1 * 3/2003 Bender et al. .............. 370/469

\* cited by examiner

*Primary Examiner*—Chi Pham
*Assistant Examiner*—Phuc Tran
(74) *Attorney, Agent, or Firm*—Philip Wadsworth; Sandra L. Godsey; Don Kordich

(57) ABSTRACT

The layers and protocols of an air interface layering architecture are designed to be modular and can be modified and upgraded to support new features, perform complex tasks, and implement additional functionality. Prior to commencement of data communication between a first entity (e.g., an access terminal) and a second entity (e.g., a radio network), a set of layers and/or protocols is selected for negotiation. For each selected layer and protocol (i.e., each attribute), a list of attribute values considered acceptable to the first entity is determined. The selected attributes and their associated attribute values are sent from the first entity and, in response, a list of processed attributes and their associated lists of processed attribute values are received. Each list of processed attribute values includes attribute values considered acceptable to the second entity. The layers and protocols in the first entity are then configured in accordance with the received list of processed attributes and their associated processed attribute values. Other features related to configurable layers and protocols are also provided.

23 Claims, 12 Drawing Sheets

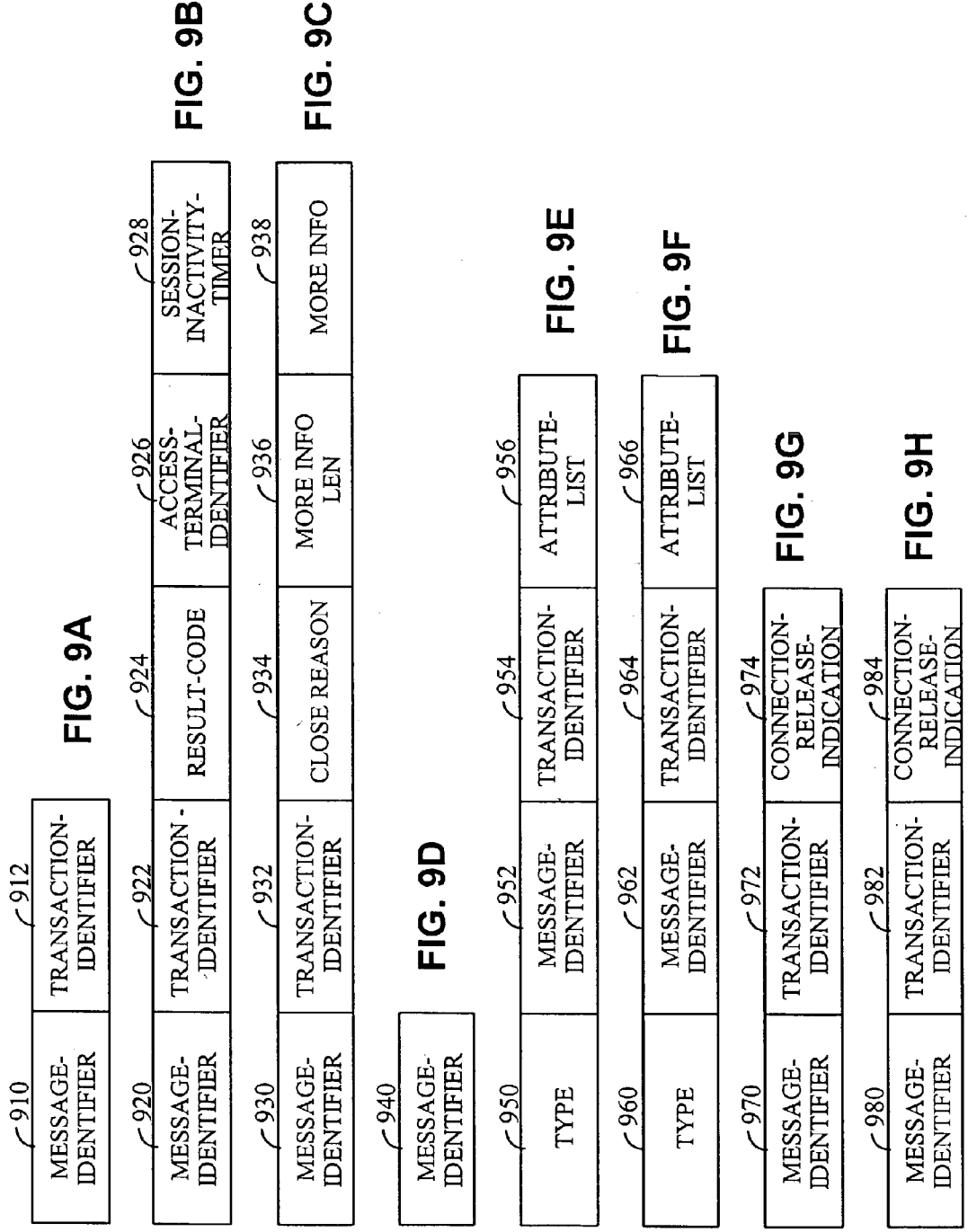

METHOD AND APPARATUS FOR PROVIDING CONFIGURABLE LAYERS AND PROTOCOLS IN A COMMUNICATIONS SYSTEM

The present application is a continuation of U.S. patent application Ser. No. 09/499,196, filed Feb. 7, 2000, and allowed Oct. 15, 2002. U.S. Pat. No. 6,539,030 is hereby incorporated by reference.

BACKGROUND OF THE INVENTION

I. Field of the Invention

The present invention relates to wireless communication. More particularly, the present invention relates to method and apparatus for providing configurable layers and protocols in a communications system.

II. Description of the Related Art

The use of code division multiple access (CDMA) modulation techniques is one of several techniques for facilitating communication in which a large number of system users are present. Although other multiple access communication system techniques are known in the art, such as time division multiple access (e.g., TDMA and GSM), frequency division multiple access (FDMA), and AM modulation schemes such as amplitude companded single sideband (ACSSB), the spread spectrum modulation techniques of CDMA have significant advantages over these other modulation techniques for multiple access communications systems. The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990, and U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992, both assigned to the assignee of the present invention and incorporated herein by reference.

CDMA systems are typically designed to conform to one or more particular CDMA standards. Examples of such CDMA standards include the "TIA/EIA/IS-95-A Mobile Station-Base Station Compatibility Standard for Dual-Mode Wideband Spread Spectrum Cellular System," the "TIA/EIA/IS-95-B Mobile Station-Base Station Compatibility Standard for Dual-Mode Wideband Spread Spectrum Cellular System," the TIA/EIA/IS-98-A, -B, and -C standards entitled "Recommended Minimum Performance Standard for Dual-Mode Spread Spectrum Cellular and PCS Mobile Stations," and "The cdma2000 ITU-R RTT Candidate Submission." New CDMA standards are continually proposed and adopted for use.

Each CDMA standard defines an air interface protocol used by that standard to support communication between communicating devices (i.e., between an access terminal and a radio network). The air interface protocol defines the mechanisms by which particular functions are to be performed, and may encompass a number of protocols that enable implementation of various functions.

Conventionally, each CDMA standard adopts a particular air interface protocol that performs a number of functions and is identified by a unique revision number. New functions can be implemented by defining new attributes, messages, and state machines, usually within the framework of the existing air interface protocol. A new air interface protocol is then defined that includes the new attributes, messages, and state machines along with other previously defined attributes, messages, and state machines. Similarly, if an existing protocol is modified or updated, a new air interface protocol is defined and a new revision is assigned.

Conventionally, each communicating device (e.g., each access terminal and radio network) is designed to support one or more complete revisions of the air interface protocol. Because the entire air interface protocol is defined by a single revision, each communicating device is required to support all required functions in a particular revision if it wishes to support any function in that revision. The communicating devices are typically designed to support one or more revisions (e.g., a range of revisions). Communication between the access terminal and radio network is then achieved using any one of the commonly supported air interface protocol revisions.

The desire for increased wireless functionality and capacity has resulted in ever more complex air interface protocols. In particular, the air interface protocols have evolved to perform numerous complex functions, including voice communication, data transmission, and so on.

The conventional method of defining a new revision for each new air interface protocol was adequate for more "simple" protocols in the original CDMA system design. As the number of functions and their complexity increase, the conventional method is cumbersome and inadequate. The conventional method also does not easily support the implementation of additional functions in an existing air interface protocol or implementation of a subset of the functions in the air interface protocol.

Thus, an air interface protocol structure that efficiently supports implementation of a variety of functions is highly desirable.

SUMMARY OF THE INVENTION

The present invention provides techniques used to implement configurable layers and protocols in a communications system. The layers and protocols of an air interface layering architecture are modular in design and can be modified and upgraded to support new features, perform complex tasks, and implement additional functionality. An access terminal and a radio network can communicate using the layers and protocols commonly supported by both, and this determination can be made at the time a communications session is opened. A basic set of layers and protocols supported by the access terminal and radio network ensures a minimum level of compatibility.

An embodiment of the invention provides a method for configuring a layer or protocol prior to commencement of data communication between a first entity (e.g., an access terminal) and a second entity (e.g., a data network). In accordance with the method, a set of one or more layers and one or more protocols is selected for negotiation, with each selected layer and protocol corresponding to an attribute to be negotiated between the first entity and the second entity. For each selected attribute, a list of selected attribute values is determined, with the list including one or more attribute values considered acceptable to the first entity. A list of selected attributes and their associated attribute values are sent from the first entity and, in response, a list of processed attributes and their associated lists of processed attribute values are received. Each list of processed attribute values includes one or more attribute values considered acceptable to the second entity. The layers and protocols in the first entity are then configured in accordance with the received list of processed attributes and their associated processed attribute values. In an embodiment, each processed attribute is associated with one processed attribute value. In an embodiment, the layers and protocols in the first entity are configured with their default values if corresponding processed attribute values are not received at the first entity The first or second entity, or both, can implement a state machine having a number of states including: (1) an inactive state indicative of inactivity prior to a session negotiation, (2) an initiated state indicative of the session negotiation over the list of selected attributes, and (3) an open state indicative of active communication between the first and second entities. The initiated state can be implemented to include (1) an access terminal initiated state indicative of the session negotiation over attributes selected by the access terminal, and (2) a radio network initiated state indicative of the session negotiation over attributes selected by the radio network.

A communications session between the first and second entities can be established by sending an open-request message from the first entity and receiving an open-response message that indicates an acceptance or rejection of the request. The open-request and open-response messages can be sent and received via common communications channels.

The selected attributes and their associated attribute values can be sent via one or more configuration-request messages, and the processed attributes and their associated attribute values can be received via one or more configuration-response messages. The messages can be identified by an entity identifier assigned to the first entity. The elements in each list of selected attribute values can be arranged in an order based on preference of the first entity, and the elements in the received configuration-response messages can be received in an order corresponding to the order of the elements in the configuration-request messages. The configuration information can be sent and received via dedicated communications channels.

The first and second entities can communicate via default layers and protocols prior to completion of the configuration of the negotiated layers and protocols. In one implementation, if the first and second entities both select a set of attributes to be negotiated, the negotiation over the set selected by the first entity is completed prior to negotiation of the set selected by the second entity.

Another embodiment of the invention provides a method for providing configurable layers or protocols, or both, in a communications system. In accordance with the method, a set of default layers and protocols is maintained for communication between a first entity and a second entity. Similarly, a set of zero or more configurable layers and one or more configurable protocols, or a combination thereof, is maintained for communication, with each configurable layer and protocol corresponding to an attribute that can be negotiated between the first and second entities. A set of configuration messages is provided that can be used for sending and receiving configuration information related to each configurable attribute. A state machine is provided to track the operating state of the first entity. The state machine can include the phases and sub-phases described above.

The set of default layers and protocols typically includes a configuration protocol used for sending and receiving messages that support negotiation and configuration of the set of configurable attributes. The configuration messages can be implemented at a session layer of the communications system. Each configuration message can include an entity identifier that identifies the first entity and a transaction identifier that identifies a particular instance of the configuration message.

Yet another embodiment of the invention provides an access terminal in a spread spectrum communications system that includes a controller, an encoder, a modulator, and a transmitter. The controller receives and processes data (e.g., traffic and signaling data), the encoder encodes the processed data, the modulator modulates the encoded data, and the transmitter converts the modulated data into an analog signal suitable for transmission over a transmission medium. The controller implements a set of layers and protocols used to support data transmission, with zero or more of the layers and one or more of the protocols, or a combination thereof, being configurable by the access terminal prior to the data transmission.

The access terminal can further include a receiver, a demodulator, and a decoder. The receiver receives a forward link signal, the demodulator demodulates the received forward link signal, the decoder decodes the demodulated signal, and the controller configures one or more of the configurable layers and protocols based, in part, on the decoded data from the decoder.

The invention further provides method and apparatus suitable for implementing configurable layers and protocols at the radio network.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 9A through 9H are diagrams of an embodiment of the format for various messages used in the negotiation and configuration of the layers and protocols.

DETAILED DESCRIPTION OF THE SPECIFIC EMBODIMENTS

Figure 1:
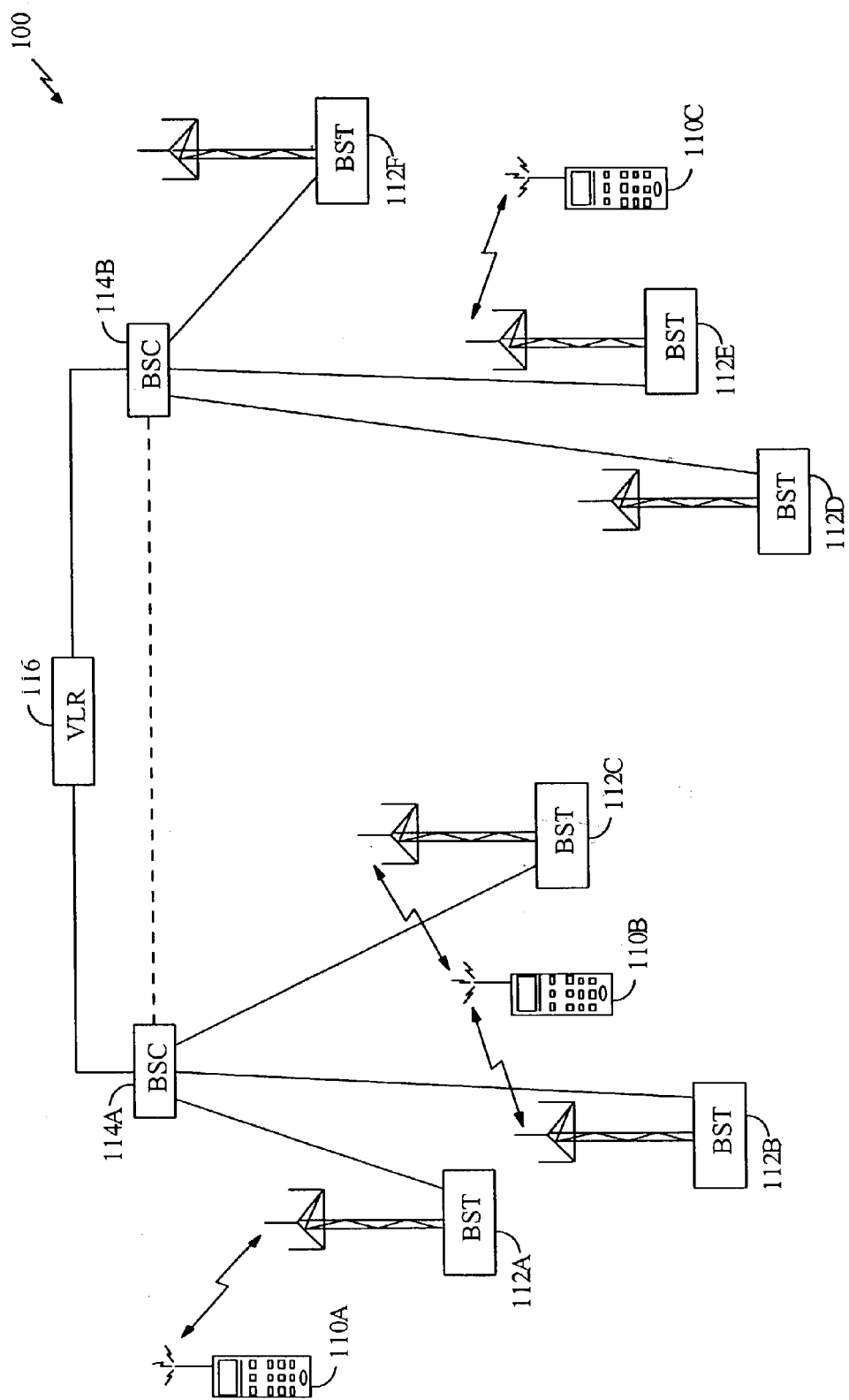
FIG. 1 shows a diagram of a spread spectrum communications system that supports a number of users.

FIG. 1 shows a diagram of a spread spectrum communications system 100 that supports a number of users. Within system 100, a set of access terminals 110a through 110c communicates with a radio network through a set of base station transceivers (BST) 112a through 112f via over-the-air links. Each base station transceiver 112 couples to a base station controller (BSC) 114 and a visitor location register (VLR) 116. Base station controllers 114a and 114b (and base station transceivers 112) may also couple directly to each other, as shown by the dashed line in FIG. 1.

As used herein, an access terminal is a device that provides data and/or voice connectivity to a user. The access terminal may be a stand-alone, self-contained data device such as a cellular telephone, a personal digital assistant (PDA), or other types of stand-alone data devices. The access terminal may also be a unit or module configurable to couple to a computing device such as a desktop or laptop personal computer. As used herein, a radio network is the network equipment (e.g., base station transceiver 112, base station controller 114, and visitor location register 116 in FIG. 1) that provides data and/or voice connectivity between a data network (e.g., a packet switched data network such as the Internet) and the access terminals. Connectivity is typically provided at a link layer, as described below.

Figure 2:
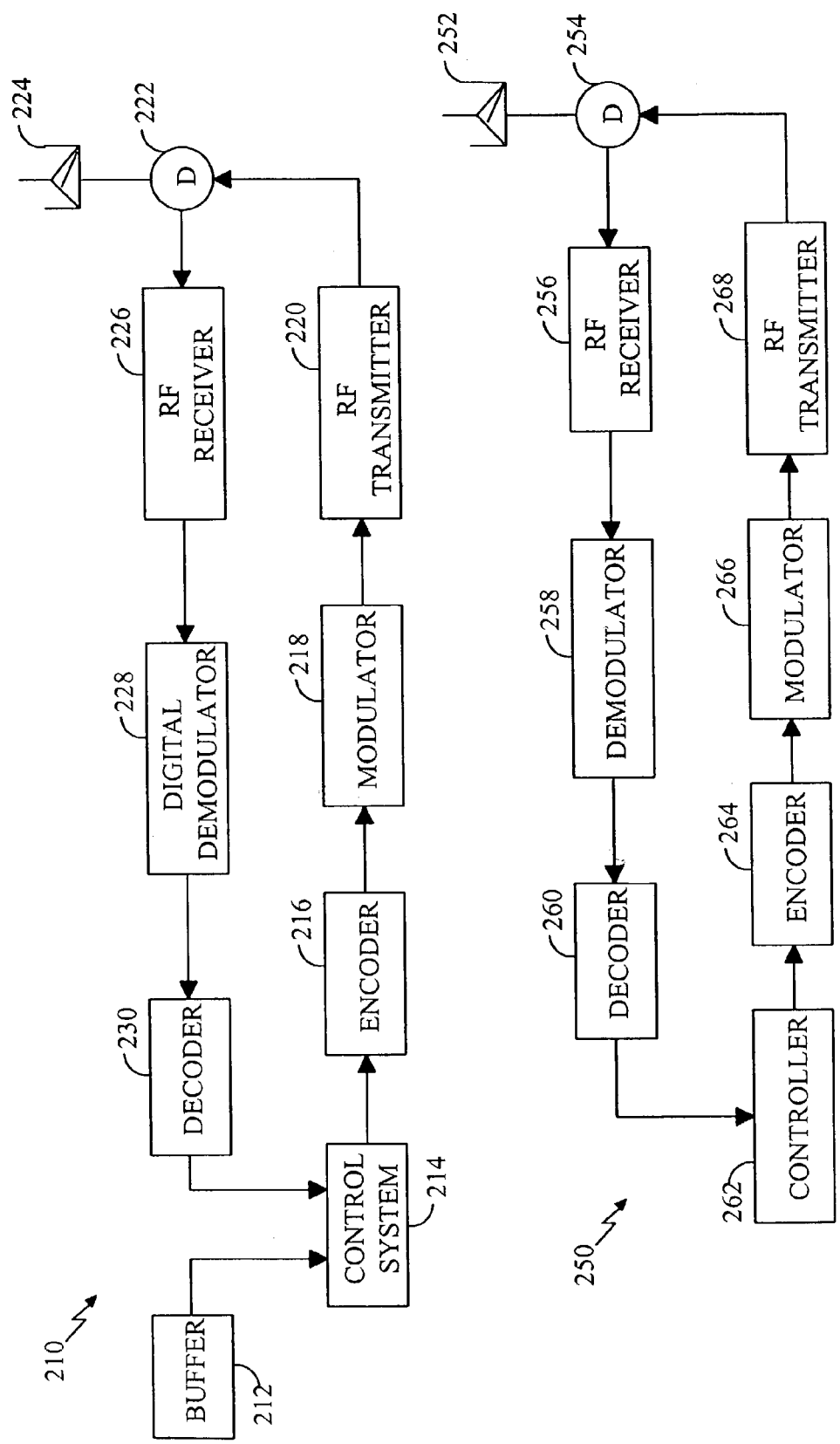
FIG. 2 shows a block diagram of an embodiment of a radio network and an access terminal.

FIG. 2 shows a block diagram of an embodiment of a radio network 210 and an access terminal 250. At radio network 210, traffic data from a buffer 212 and control data from a control system 214 is provided to an encoder 216 that encodes the data with a particular encoding format. The encoding format may include, for example, cyclic redundancy check (CRC) encoding, convolutional encoding, serial-concatenated coding, Reed-Solomon block encoding, Walsh covering, pseudo-noise (PN) spreading, and so on, which are typically used for CDMA systems. The encoded data is provided to a modulator 218 that modulates the data with a particular modulation format such as, for example, quadrature phase shift keying (QPSK), offset QPSK, or others. A transmitter 220 receives and converts the modulated data into an analog signal, conditions the signal, and transmits the signal over the air via a duplexer (D) 222 and an antenna 224.

At access terminal 250, the transmitted signal is received by an antenna 252, routed through a duplexer (D) 254, and provided to a receiver 256. Receiver 256 conditions the signal and provides the conditioned signal to a demodulator 258. The signal conditioning may include filtering, amplification, frequency conversion, and so on. Demodulator 258 demodulates the conditioned signal with a demodulation format that is complementary to the modulation format used at radio network 210. A decoder 260 receives and decodes the demodulated data with a decoding format that is complementary to the encoding format used at radio network 210. The decoded data is then provided to a controller 262.

Traffic and control data transmission from access terminal 250 to radio network 210 occurs via a complementary signal path. The traffic data from a buffer (not shown in FIG. 2) and the control data from controller 262 is encoded by an encoder 264, modulated by a modulator 266, conditioned by a transmitter 268, routed through duplexer 254, and transmitted via antenna 252. At radio network 210, the transmitted signal is received by antenna 224, routed through duplexer 222, conditioned by an RF receiver 226, demodulated by a demodulator 228, decoded by a decoder 230, and provided to control system 214.

As used herein, a forward transmission refers to a transmission from radio network 210 to access terminal 250, and a reverse transmission refers to a transmission from access terminal 250 to radio terminal 210. The demodulation and decoding formats on the reverse path can be, and is typically, different from those of the forward path.

As with many communications systems, the communication between the access terminal and radio network is achieved via a set of "layers" that define the modes of operation, the supported features, and the capabilities of the communications system. Each layer consists of one or more layer protocols (or simply protocols) that perform the layer's functionality. Each layer communicates with the layer above it, below it, or both, via defined interfaces.

Originally, a CDMA system that conforms to the IS-95 standard supports one air interface protocol that defines the layers and their protocols. In some opinions, the IS-95 standard does a poor job of separating the protocols by function. The original air interface protocol has been modified numerous times to support additional functionality, such as improved Medium Access Control (MAC) functions. To implement the additional functionality, the necessary changes are made to the affected layers of the original air interface protocol and the modified air interface protocol is identified with a new revision number (and typically defined as a new standard). The modified air interface protocol typically retains most of the structures of the original air interface protocol (e.g., the same data frame structure, the same frame length, and so on), in order to maintain as much compatibility as possible with pre-existing systems and standards.

Once adopted, a new air interface protocol can be practiced by the access terminal and radio network if both are designed to support that air interface protocol. This method for generating new air interface protocols does not allow for easy implementation of new functions and features in the CDMA system.

In accordance with an aspect of the invention, the layers and their protocols are designed in a modular manner such that each layer (or protocol) can be modified or updated without the need to modify the remaining layers (or protocols). This can be achieved, in part, by defining and maintaining the interfaces between the layers such that new functions can be easily supported. The modular design also allows for isolated modification of a layer and its protocol(s).

Each layer includes one or more protocols that perform that layer's functionality. In accordance with another aspect of the invention, the protocol(s) of a particular layer can be individually negotiated between the access terminal and radio network (e.g., at the start of a communications session). The access terminal and radio network can each be designed to support a different set of protocols, but they can still communicate with each other via the protocols that are common to both. The negotiated layers and protocols feature allows for flexibility in the design and use of different versions of an air interface protocol, without the need to explicitly define and maintain each modification as a new air interface protocol, as is conventionally done.

Figure 3:
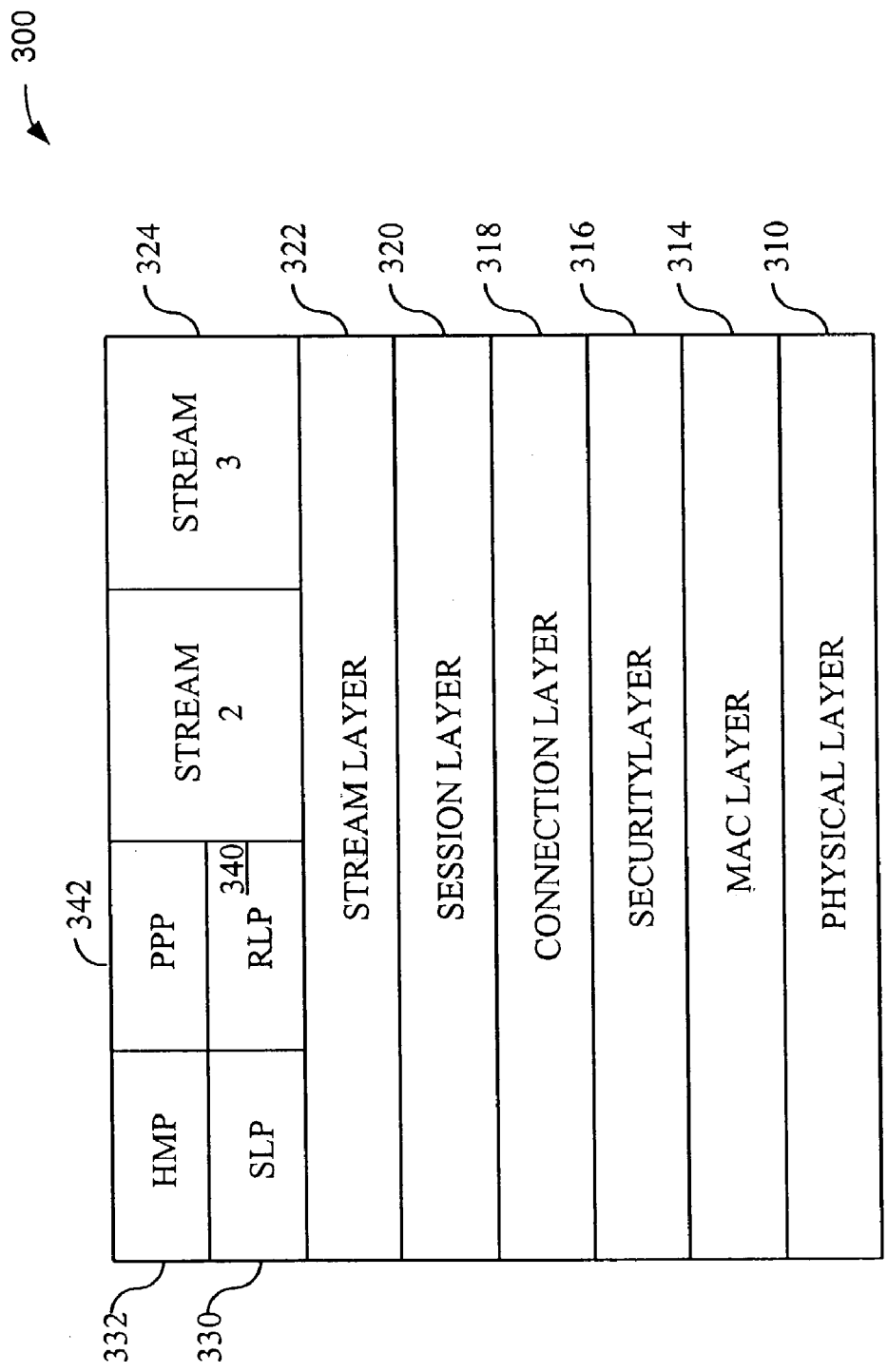
FIG. 3 shows a diagram of an embodiment of an air interface layering architecture supported by the invention.

FIG. 3 shows a diagram of an embodiment of an air interface layering architecture 300 supported by the invention. As shown in FIG. 3, layering architecture 300 comprises seven layers, which are identified as: (1) a physical layer 310, (2) a medium access control (MAC) layer 314, (3) a security layer 316, (4) a connection layer 318, (5) a session layer 320, (6) a stream layer 322, and (7) an application layer

324. For a better understanding of the present invention, a brief description of the main function of each layer is provided below.

Physical layer 310 defines the "physical" characteristics of the transmission between the access terminal and radio network. These physical characteristics may include, for example, the channel structure, the transmission frequency, the output transmit power level, the modulation format, the encoding scheme, and so on, for the forward and reverse links.

MAC layer 314 defines the procedures used to transmit and receive data over physical layer 310.

Security layer 316 provides secured services that may include, for example, authentication and encryption services.

Connection layer 318 provides air link connection establishment and maintenance services.

Session layer 320 provides layer and protocol negotiation, protocol configuration, and state maintenance services. Session layer 320 is described in further detail below.

Stream layer 322 provides multiplexing of various application streams. In a specific embodiment, the communications system supports four application streams labeled as streams 0 through 3. In an embodiment, stream 0 is used for signaling between the access terminal and radio network, stream 1 is used for packet data transmission, and streams 2 and 3 are used for other applications. As shown in FIG. 3, the signaling stream (e.g., stream 0) is supported by a Signaling Link Protocol (SLP) 330 and a High Data Rate Messaging Protocol (HMP) 332, and the packet data stream (e.g., stream 1) is supported by a Radio Link Protocol (RLP) 340 and a Point to Point Protocol (PPP) 342. In an embodiment, a default signaling stream (i.e., a default HMP/SLP) is used as the default for stream 0 and a default packet service (i.e., a default PPP/RLP) is used as the default for stream 1, if these streams have not been negotiated between the access terminal and radio network.

SLP 330 provides reliable and "best-effort" delivery mechanisms for signaling messages, and HMP 332 provides message transmission services for signaling messages. RLP 340 provides retransmission and duplicate data detection for a particular defined data stream and one implementation is further described in IS-707. A different implementation of RLP 340 than that described in IS-707 can be designed and used, and this is within the scope of the present invention. When used in the context of the default packet service, RLP 340 can be defined to carry PPP packets. PPP 342 provides framing and multi-protocol support, and is further described by W. Simpson in "The Point-to-Point Protocol (PPP)," RFC 1661, July 1994. Protocols running on top of PPP 342 can carry traffic data as well as perform various network administration tasks.

FIG. 3 shows a specific embodiment of a layering architecture supported by the present invention. Other layering architectures having additional layers, fewer layers, or different layers can also be supported by the present invention.

Figure 4A:
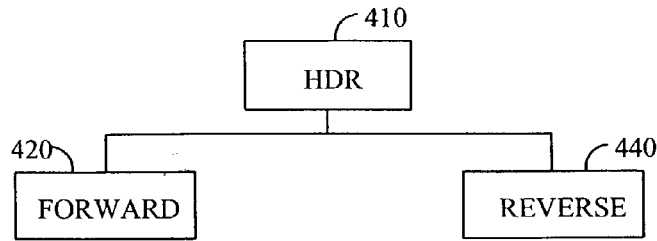
FIGS. 4A through 4C are diagrams of a specific embodiment of a high data rate (HDR) channel structure, a forward channel structure, and a reverse channel structure, respectively.
Figure 4B:
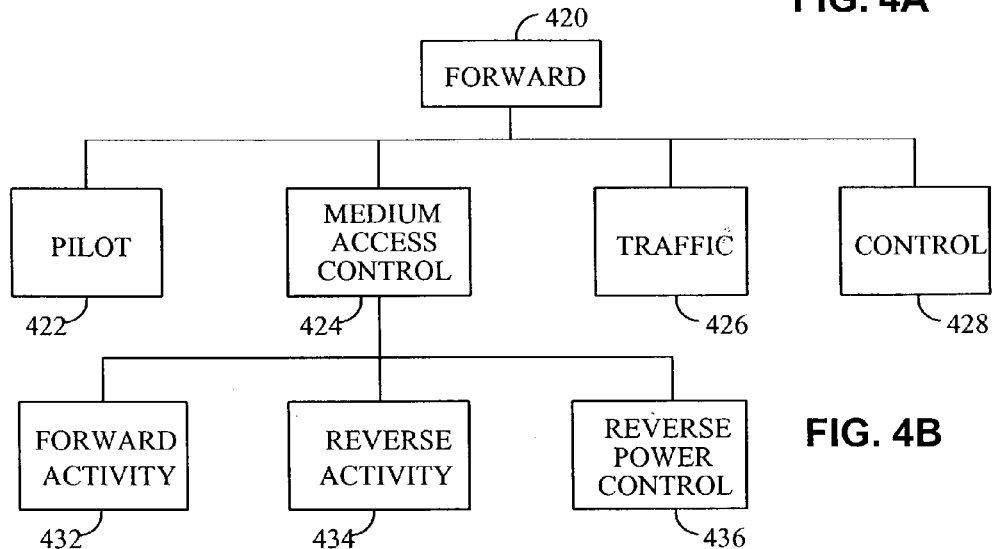
Figure 4C:
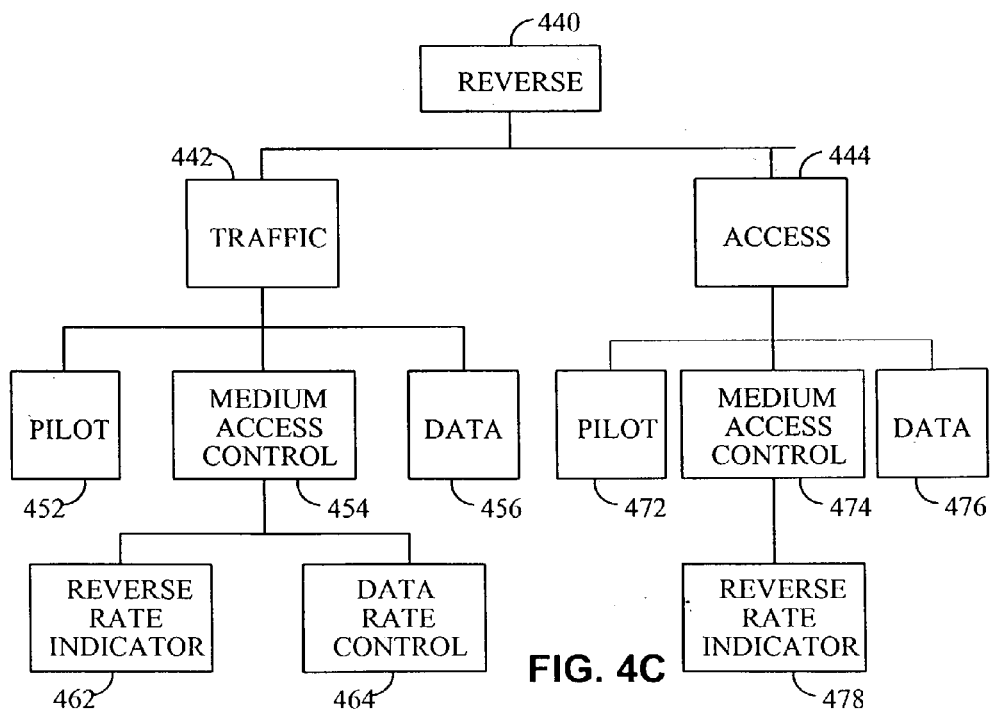

FIGS. 4A through 4C are diagrams of a specific embodiment of a high data rate (HDR) channel structure 410, a forward channel structure 420, and a reverse channel structure 440, respectively, supported by a communication system (e.g., communications system 100 in FIG. 1). HDR channel structure 410 includes forward channel structure 420 that is used to transmit data from the radio network to the access terminal, and reverse channel structure 440 that is used to transmit data from the access terminal to the radio network. The forward and reverse channel structures are designed to provide the required functionality, and each channel structure is designed based on the particular characteristics of the data transmission in the forward or reverse link.

FIG. 4B shows a diagram of an embodiment of forward channel structure 420. In this embodiment, forward channel structure 420 includes a pilot channel 422, a MAC channel 424, one or more traffic channels 426, and one or more control channels 428. MAC channel 424 further includes a forward activity channel 432, a reverse activity channel 434, and a reverse power control channel 436. These channels can be designed in various manners, and this is within the scope of the present invention. The pilot, MAC, and control channels are "common" channels shared by a number of access terminals in communication with the radio network. The traffic channel is a "dedicated" channel(s) assigned to the access terminal upon establishment of a session.

FIG. 4C shows a diagram of an embodiment of reverse channel structure 440. In this embodiment, reverse channel structure 440 includes one or more traffic channels 442 and an access channel 444. Traffic channel(s) 442 further includes a pilot channel 452, a MAC channel 454, and one or more data channels 456. MAC channel 454 can further includes a reverse rate indicator channel 462 and a data rate control channel 464. Access channel 444 further includes a pilot channel 472, a MAC channel 474, and one or more data channels 476. MAC channel 474 can further include a reverse rate indicator channel 478. Again, these channels can be designed in various manners, and this is within the scope of the present invention. As with the forward channel structure, the traffic channel is a "dedicated" channel(s) and the access channel is a "common" channel shared with other access terminals.

A number of terms are used to describe the invention, and these terms are defined below.

A session refers to a shared operating state between an access terminal and a radio network. The shared operating state stores the protocols and the protocol configurations that have been negotiated and are available for use in communication between the access terminal and radio network. In accordance with an aspect of the invention, the layers, protocols, and protocol configurations can be negotiated between the access terminal and radio network when a session is set up and, in some implementations, can be renegotiated at any time during the session. In an embodiment, other than to set up a session, an access terminal is not able to communicate with a radio network without having an open session (i.e., the access terminal can communicate with the radio network for the express purpose of opening a session).

A connection is a particular state of the air-link in which the access terminal is assigned dedicated air-link resources (e.g., a forward traffic channel, a reverse traffic channel, and associated MAC channels). During any particular session, the access terminal and radio network can open and close a connection multiple times. In an embodiment, other than to set up a session, a connection does not exist without a session.

A stream is a transmission channel used to send information for a particular application. A stream can be defined to carry signaling information, traffic data, other types of data, or a combination thereof. The access terminal and radio network can be, and is typically, designed to support concurrent transmissions of multiple streams. Streams can be used to carry data with different quality of service (QoS) requirements, or other applications.

Figure 5:
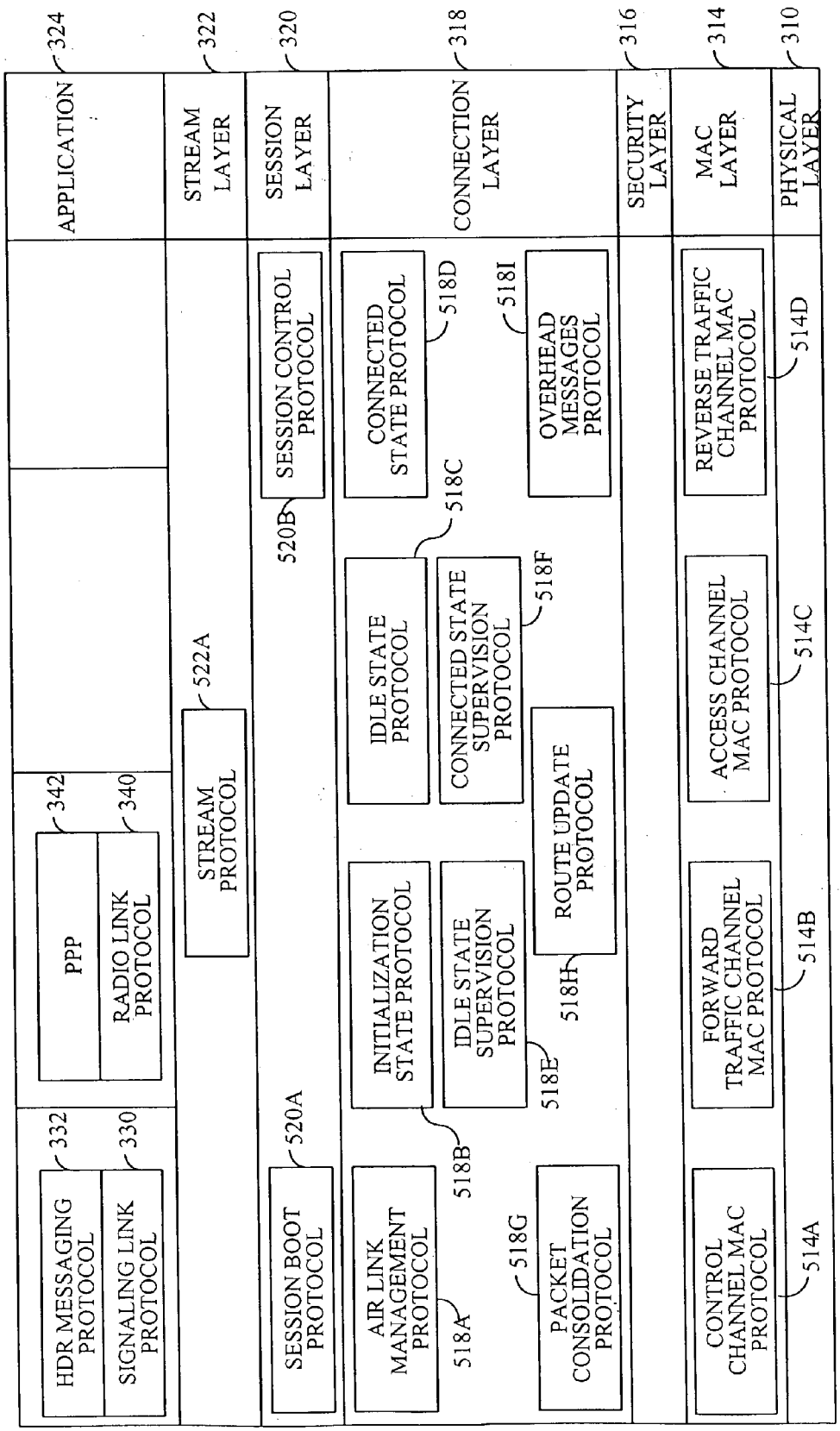
FIG. 5 shows a diagram of a specific embodiment of the layers and their protocols for the layering architecture shown in FIG. 3.

FIG. 5 shows a diagram of a specific embodiment of the layers and their protocols for layering architecture 300 in FIG. 3, which are designed to support HDR channel structure 410 in FIGS. 4A through 4C. As shown in FIG. 5, each layer includes one or more protocols that perform the layer's functionality. The protocols use signaling messages and/or headers to convey information to the other entity at the other side of the air link. FIG. 5 shows some of the protocols included in the layers of layering architecture 300.

In the embodiment shown in FIG. 5, MAC layer 314 includes a control channel MAC protocol 514a, a forward traffic channel MAC protocol 514b, an access channel MAC protocol 514c, and a reverse traffic channel MAC protocol 514d. Control channel MAC protocol 514a provides the procedures used by the radio network to transmit, and the access terminal to receive, control channel 428. Forward traffic channel MAC protocol 514b provides the procedures used by the radio network to transmit, and the access terminal to receive, forward traffic channel 426. Access channel MAC protocol 514c provides the procedures used by the access terminal to transmit, and the radio network to receive, access channel 444. And reverse traffic channel MAC protocol 514d provides the procedures used by the access terminal to transmit, and the radio network to receive, reverse traffic channel 442.

Security layer 316 includes zero or more security protocols designed to protect against theft of the signal transmissions. In an embodiment, security layer 316 includes a basic security protocol (not shown in FIG. 4) that protects against theft-of-service and theft-of-identity. Sensitive data communication can typically be protected using end-to-end authentication and encryption, and additional security at security layer 316 is typically not needed. However, interfaces are provided to allow various security protocols to be added, as needed.

Connection layer 318 includes an air-link management protocol 518a, an initialization state protocol 518b, an idle state protocol 518c, a connected state protocol 518d, an idle state supervision protocol 518e, a connected state supervision protocol 518f, a packet consolidation protocol 518g, a route update protocol 518h, and an overhead messages protocol 518i. Air-link management protocol 518a provides the overall state machine management that the access terminal and radio network follow during a connection. Initialization state protocol 518b provides the procedures that the access terminal follows to acquire a radio network and the procedures that the radio network follows to support network acquisition. Idle state protocol 518c provides the procedures that the access terminal and radio network follow when a connection is not open. Connected state protocol 518d provides the procedures that the access terminal and radio network follow when a connection is open. Idle state supervision protocol 518e provides the supervision procedures that the access terminal follows when a connection is not open. Connected state supervision protocol 518f provides the supervision procedures the access terminal and radio network follow when a connection is open. Packet consolidation protocol 518g provides transmit prioritizing and packet encapsulation for connection layer 318. Route update protocol 518h provides the means to maintain a route between the access terminal and radio network. And overhead messages protocol 518i provides broadcast messages containing information used by the protocols in connection layer 318.

Session layer 320 includes a session boot protocol 520a and a session control protocol 520b. Session boot protocol 520a provides the initial message exchange used to start a session and further provides the means to reject an access terminal that does not currently have a session. The initial message exchange assigns the access terminal with a UATI (Unicast Access Terminal Identifier) and selects the session control protocol that in turn negotiates and configures the protocols used in the session. The UATI is also referred to herein as a "terminal identifier." In an embodiment, session boot protocol 520a is non-negotiable.

Session control protocol 520b provides initial negotiation and configuration of the protocols used during a session and further supports session supervision and session closing procedures. In an embodiment, session control protocol 520b supports two phases of negotiation—an access terminal (AT) initiated negotiation and a radio network (RN) initiated negotiation. In the AT initiated negotiation phase, negotiation exchanges are initiated by the access terminal. This phase is typically used to negotiate the protocols that will be used in the session and to negotiate the configurations for the protocols (e.g., authentication key lengths). In the AN initiated negotiation phase, negotiation exchanges are initiated by the radio network. This phase is typically used to override default values used by the negotiated protocols. Session control protocol 520b can also provide a session keep alive mechanism. In an embodiment, in accordance with the keep alive mechanism, if nothing has flowed between the access terminal and radio network for some period of time, then one entity sends a keep alive message to which the other entity responds.

Session boot protocol 520a and session control protocol 520b are described in further detail below.

Stream layer 322 includes a stream protocol 522a. In the transmit direction, stream protocol 522a adds a stream header to data packets and ensures that the packets are octet aligned. In the receive direction, stream protocol 522a removes the stream header and forwards the packets to the proper application.

In an embodiment, the protocols are defined by their interfaces and protocol states. In a specific embodiment, four types of interfaces are defined and include: (1) headers and messages, (2) commands, (3) indications, and (4) public data. For the following discussion, the term "entity" is used to denote either the access terminal or the radio network.

Headers and messages are used for communication between a protocol executing in one entity and the same protocol in the other entity.

Commands are used by a higher layer protocol to obtain a service from a lower layer protocol in the same entity. For example, commands can be used as primitives by a higher layer to cause a protocol at a lower layer to take some action (e.g., to abort any access attempt currently in progress). In an embodiment, commands can be sent between protocols in the same layer but are limited to one direction (i.e., the entity that receives a command from a particular protocol is prohibited from sending a command to the other entity in the same protocol).

Indications are used by a lower layer protocol to convey information regarding the occurrence of an event (e.g., to provide notifications when certain events occur). In an embodiment, protocols in a higher layer or in the same layer can register to receive indications. In an embodiment, indications between protocols in the same layer are limited to one direction (i.e., if protocol A registers to receive indications from protocol B in the same layer, protocol B is prohibited from registering to receive indications from protocol A).

Public data is used to share information in a controlled manner between protocols. Protocols can make available to other protocols some of the data they generate or receive through messages. Public data can be shared between protocols in the same layer as well as between protocols in different layers.

Protocol states are used to identify the particular operating states of a particular protocol. Each protocol state can be associated with a particular set of behavior characteristics that may be dependent on, for example, the operation condition, the environment of the entity (e.g., if a connection is opened or not, if a session is opened or not, and so on), and other factors. Transitions between protocol states are triggered by the occurrence of particular events, which are also captured by the operating states. Examples of events that can lead to a state transition include the receipt of a message, a command from a higher layer protocol, an indication from a lower layer protocol, and the expiration of a timer.

The radio network is capable of communicating with a number of access terminals concurrently. The radio network instantiates a signaling protocol for each access terminal with which it communicates and thereafter maintains a protocol state machine for the access terminal. The radio network is capable of maintaining multiple independent instantiations of the signaling protocol, each with its own independent state machine.

In an embodiment, an inactive state, an open state, and a close state are provided for each of a number of protocols. The inactive state is entered when the protocol is not functional at a particular time. For example, the access channel MAC protocol at the access terminal enters the inactive state when it has an open connection. The open state indicates that the session or connection (as applicable to the protocol) is opened, and the close state indicates that the session or connection is closed. In an embodiment, all states of a particular protocol other than the inactive state are collectively referred to as active states, although they may be individually named. For example, the forward traffic channel MAC protocol can be designed to have three states: inactive, variable rate, and fixed rate, with the variable and fixed rate states being referred to as the active states.

Each protocol supports a set of commands that facilitates communication with other protocols. Some common commands supported by many of the protocols include activate, deactivate, open, and close. Activate commands the protocol to transition from the inactive state to some other state. Deactivate commands the protocol to transition to the inactive state. Open (or close) commands the protocol to perform a function related to a session open (or close) or a connection open (or close).

In accordance with an aspect of the invention, a number of applications, layers, protocols, or configurations (i.e., for the applications, layers, and protocols), or a combination thereof, can be negotiated and configured when a session is set up. Each stream, layer and protocol is assigned a unique identifier (referred to herein as a Type) that identifies the general stream, layer or protocol (e.g., access channel MAC protocol). In a specific implementation, the identifier is an 8-bit value. The layering (e.g., shown in FIG. 3) can also be negotiated.

In an embodiment, a stream, layer or protocol may further be associated with a Subtype that identifies a specific instance of the layer or protocol (e.g., the default access channel MAC protocol and perhaps one day, the extended and bloated access channel MAC protocol, or others).

The layering architecture shown in FIG. 3 supports a variety of applications. In accordance with an aspect of the invention, for minimum compatibility, a set of default applications are defined which is supported by all access terminals and radio networks. In an embodiment, the default applications include a default signaling application and a default packet application. The default signaling application provides the means to send messages between a protocol in one entity and the same protocol in the other entity. The default packet application provides a PPP octet stream between the entities.

In an embodiment, the default signaling protocol includes (1) a messaging protocol (e.g., the HDR messaging protocol) and (2) a link layer protocol that provides message fragmentation, retransmission, and duplicate data detection (e.g., the Signaling Link Protocol SLP). In an embodiment, the default packet application includes (1) the PPP (i.e., as defined by IETF RFC 1661) that provides PPP octet stream and (2) a link layer protocol (e.g., the Radio Link Protocol RLP) that provides octet retransmission and duplicate data detection.

In accordance with an aspect of the invention, the applications to be used, the streams on which the applications are carried, the layers, the protocols, and the configurations can be negotiated as part of a session negotiation. In an embodiment, the session negotiation is implemented in the session layer. In accordance with another aspect of the invention, each access terminal and radio network is designed to support a basic layering architecture and a basic set of protocols. Upon initiation of a communication between the access terminal and radio network, a session negotiation is performed, and the protocols in the basic set and additional protocols can be negotiated between the entities.

A set of default applications, layers, protocols, and configurations is used to support communication between the entities until the protocols are negotiated. Each layer includes zero or more default protocols. Default overhead signaling protocol messages can be used to exchange information related to the default layers, protocols, and configurations. The access terminal and radio network use the default settings until the session negotiation is completed, at which point they apply the negotiated layers, protocols, and configurations for used in subsequent communication.

Figure 6A:
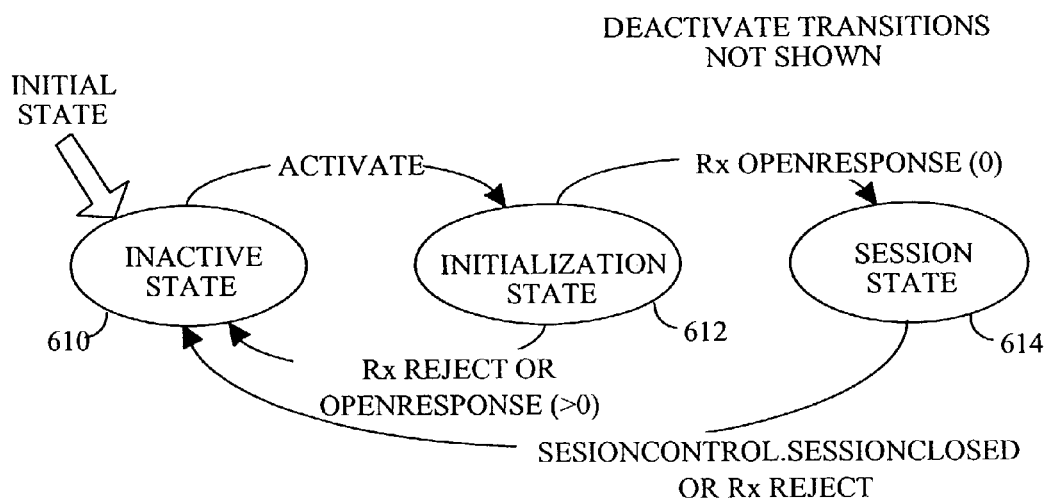
FIGS. 6A and 6B show state diagrams of an embodiment of a session boot protocol for the access terminal and radio network, respectively.

FIG. 6A shows a state diagram of an embodiment of a session boot protocol (e.g., session boot protocol 520a in FIG. 5) for the access terminal, which includes an inactive state 610, an initialization state 612, and a session state 614. As shown in FIG. 6A, the session boot protocol for the access terminal transitions from an initial state to inactive state 610 to open a session. In inactive state 610, there are no communications between the access terminal and radio network. Upon transmission or receipt of an activate message, the protocol transitions to initialization state 612 in which the access terminal and radio network exchange the open-request and open-response messages. The protocol transitions back to inactive state 610 if the received open-response message indicates that the request is rejected and transitions to session state 614 if the request is accepted. Via the exchange of open-request and open-response messages, the access terminal is assigned a UATI (i.e., a terminal identifier) and a session control protocol is selected for use in the session negotiation. In session state 614, a session is either open or in the process of being negotiated by the session control protocol selected in initialization state 612. The protocol transitions from session state 614 back to inactive state 610 upon sending or receiving a close message or upon receiving a rejection message from the radio network.

Figure 6B:
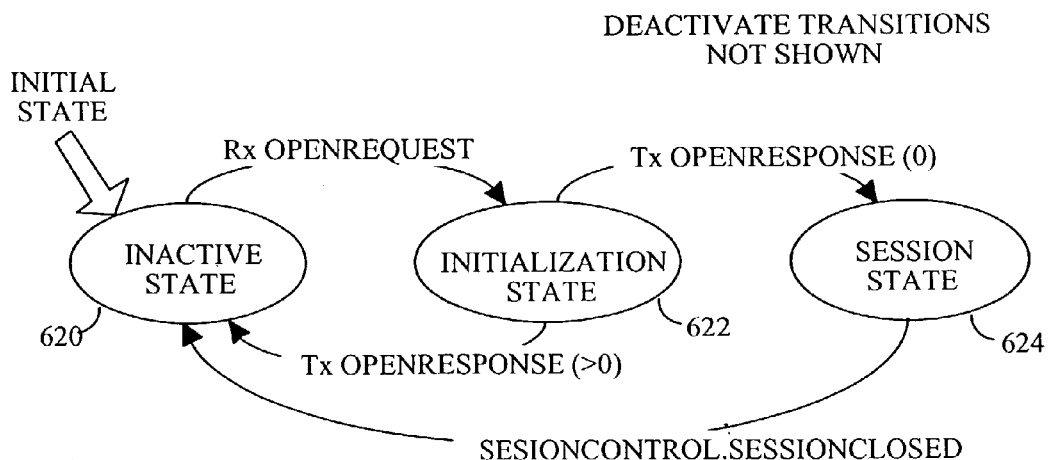

FIG. 6B shows a state diagram of an embodiment of a session boot protocol for the radio network, which includes an inactive state 620, an initialization state 622, and a session state 624. The session boot protocol for the radio network enters inactive state 620 upon receiving an indication to open a session. The protocol transitions from inactive state 610 to initialization state 612 upon receiving an open-request message from the access terminal. The open-request message is processed and the protocol transitions back to inactive state 620 upon transmission of an open-response message indicative of rejection of the open request, and to session state 624 upon transmission of an open-response message indicative of acceptance of the request. The protocol transitions from session state 624 back to inactive state 620 upon transmission or receipt of a close message.

Figure 6C:
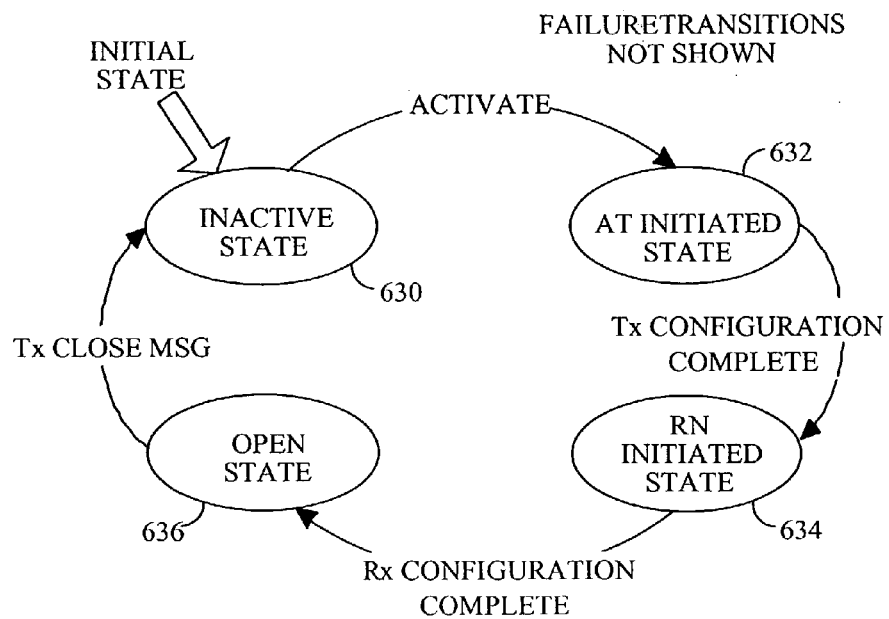
FIGS. 6C and 6D show state diagrams of an embodiment of a session control protocol for the access terminal and radio network, respectively.

FIG. 6C shows a state diagram of an embodiment of a session control protocol (e.g., session control protocol 520b in FIG. 5) for the access terminal, which includes an inactive state 630, an AT initiated state 632, a RN initiated state 634, and an open state 636. The session control protocol for the access terminal transitions from an initial state to inactive state 630 for a session negotiation. In inactive state 630, the protocol waits for an activate command and, upon its receipt or transmission, transitions to AT initiated state 632. In AT initiated state 632, negotiation is performed at the initiative of the access terminal and upon its completion (e.g., as designated by the transmission of a configuration-complete message), the protocol transitions to RN initiated state 634. In RN initiated state 634, negotiation is performed at the initiative of the radio network and upon its completion (e.g., as designated by receipt of a configuration-complete message), the protocol transitions to open state 636. In open state 636, the session is open and can be used to exchange application traffic (e.g., over streams 0 through 3) between the access terminal and radio network. The protocol transitions from open state 636 back to inactive state 630 upon closing of the session (e.g., upon transmission of a close message).

Figure 6D:
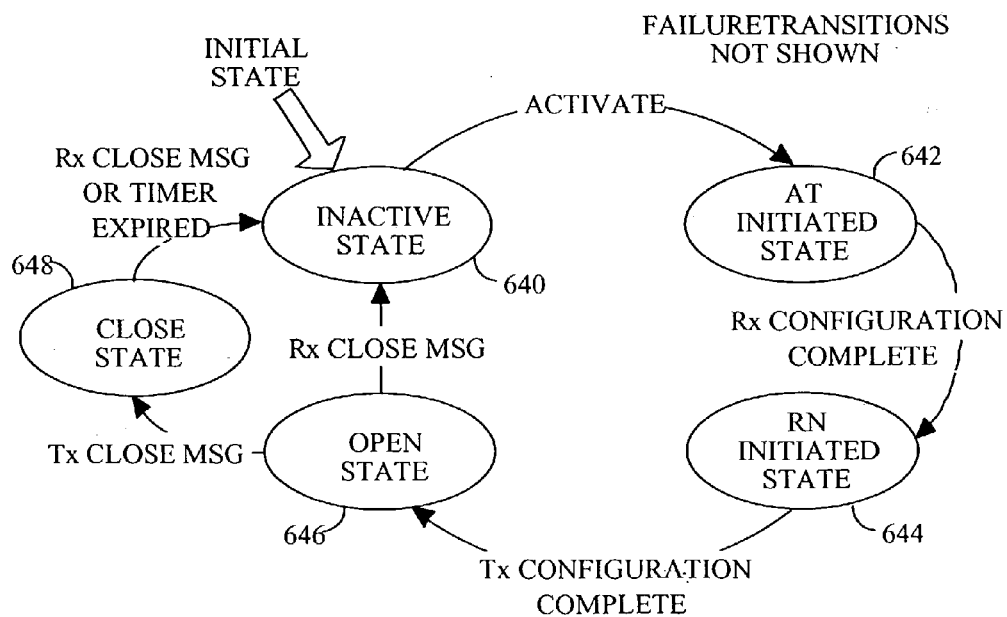

FIG. 6D shows a state diagram of an embodiment of a session control protocol for the radio network, which includes an inactive state 640, an AT initiated state 642, a RN initiated state 644, an open state 646, and a close state 648. The session control protocol for the radio network transitions to inactive state 640 for a session negotiation. In inactive state 640, the protocol waits for an activate command and, upon its receipt or transmission, transitions to AT initiated state 642. In AT initiated state 642, the access terminal initiated negotiation is performed and upon its completion (e.g., as designated by the receipt of a configuration-complete message), the protocol transitions to RN initiated state 644. In RN initiated state 644, the radio network initiated negotiation is performed and upon its completion (e.g., as designated by the transmission of a configuration-complete message), the protocol transitions to open state 646. In open state 646, the session is open and can be used to exchange application traffic between the access terminal and radio network. The protocol transitions from open state 646 back to inactive state 640 upon receipt of a close message and to close state 648 upon transmission of a close message. From close state 648, the protocol transitions back to inactive state 640 upon receipt of a close message or expiration of a timer.

For simplicity, not all transitions are shown in FIGS. 6A through 6D. For example, the deactivate transitions are not shown in FIGS. 6A and 6B, and the failure transitions are not shown in FIGS. 6C and 6D.

Figure 7A:
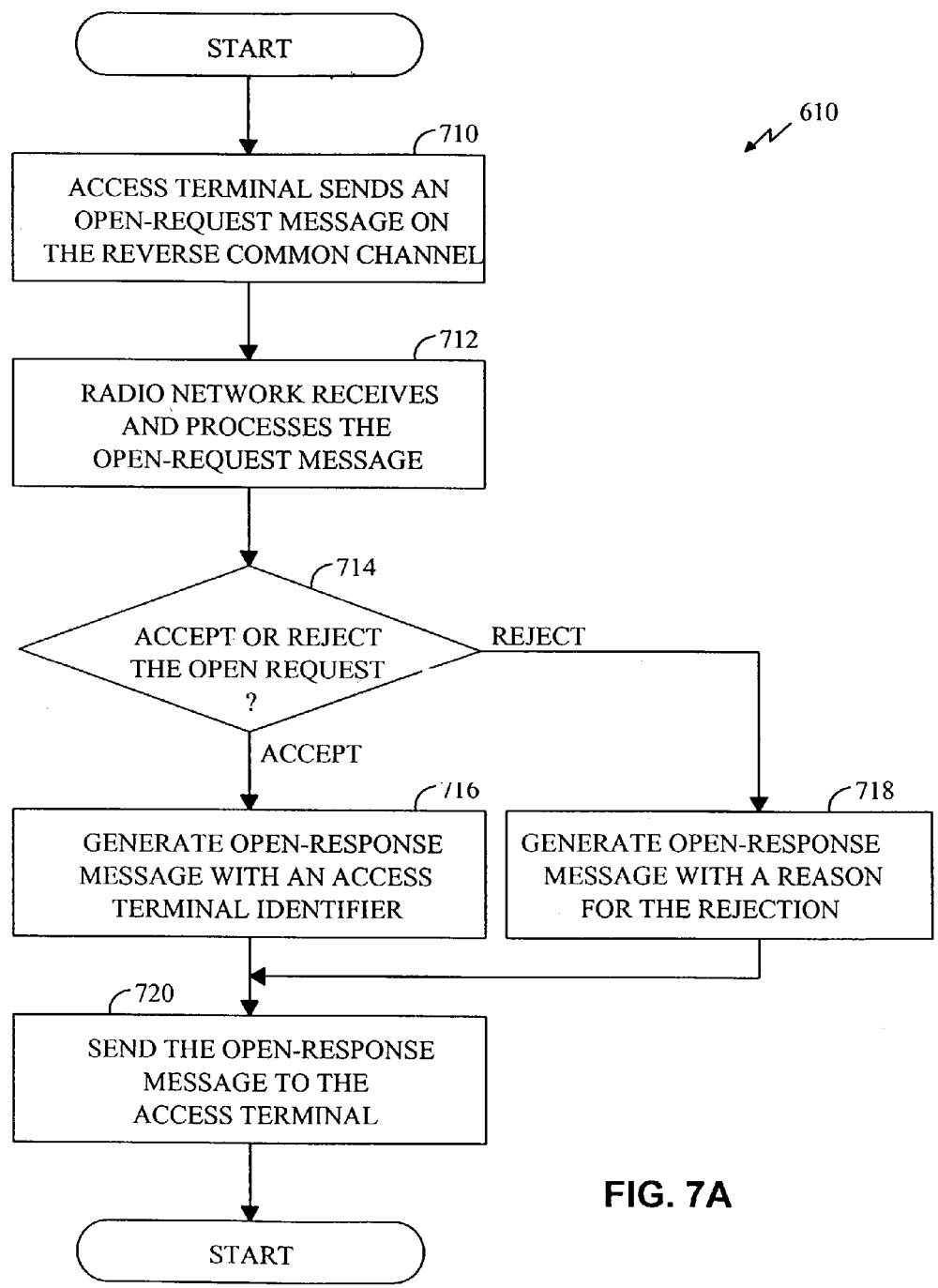
FIG. 7A shows a flow diagram of a specific implementation of a session open phase.

FIG. 7A shows a flow diagram of a specific implementation of session open phase 610. The protocol in session open phase 610 uses an open-request message and an open-response message to allow the access terminal to request and receive an access terminal identifier. The access terminal initiates the message exchange by sending an open-request message on the reverse common channel (e.g., access channel 444 in FIG. 4C) and identifies itself with a random access terminal identifier, at block 710. The radio network receives and processes the open-request message, at block 712.

At block 714, the radio network determines whether to accept or reject the open request. If the session request is accepted, the radio network assigns an access terminal identifier to the access terminal and generates an open-response message that includes the assigned identifier, at block 716. The access terminal identifier is to be used by the access terminal for the duration of the session. Otherwise, if the session request is rejected, the radio network generates an open-response message that includes a reason for the rejection, at block 718. The open-response message further includes the random access terminal identifier extracted from the open-request message received from the access terminal. The open-response message is then sent to the access terminal on the forward common channel (e.g., control channel 428), at block 720. In an embodiment, the messages in session open phase 610 are carried out by the (default) session protocol.

As shown in FIG. 6B, session configuration phase 620 includes a session layer/protocol negotiation sub-phase 622, a session layer/protocol configuration sub-phase 624, and a session layer/protocol activation sub-phase 626. These sub-phases are described in further detail below.

Figure 7B:
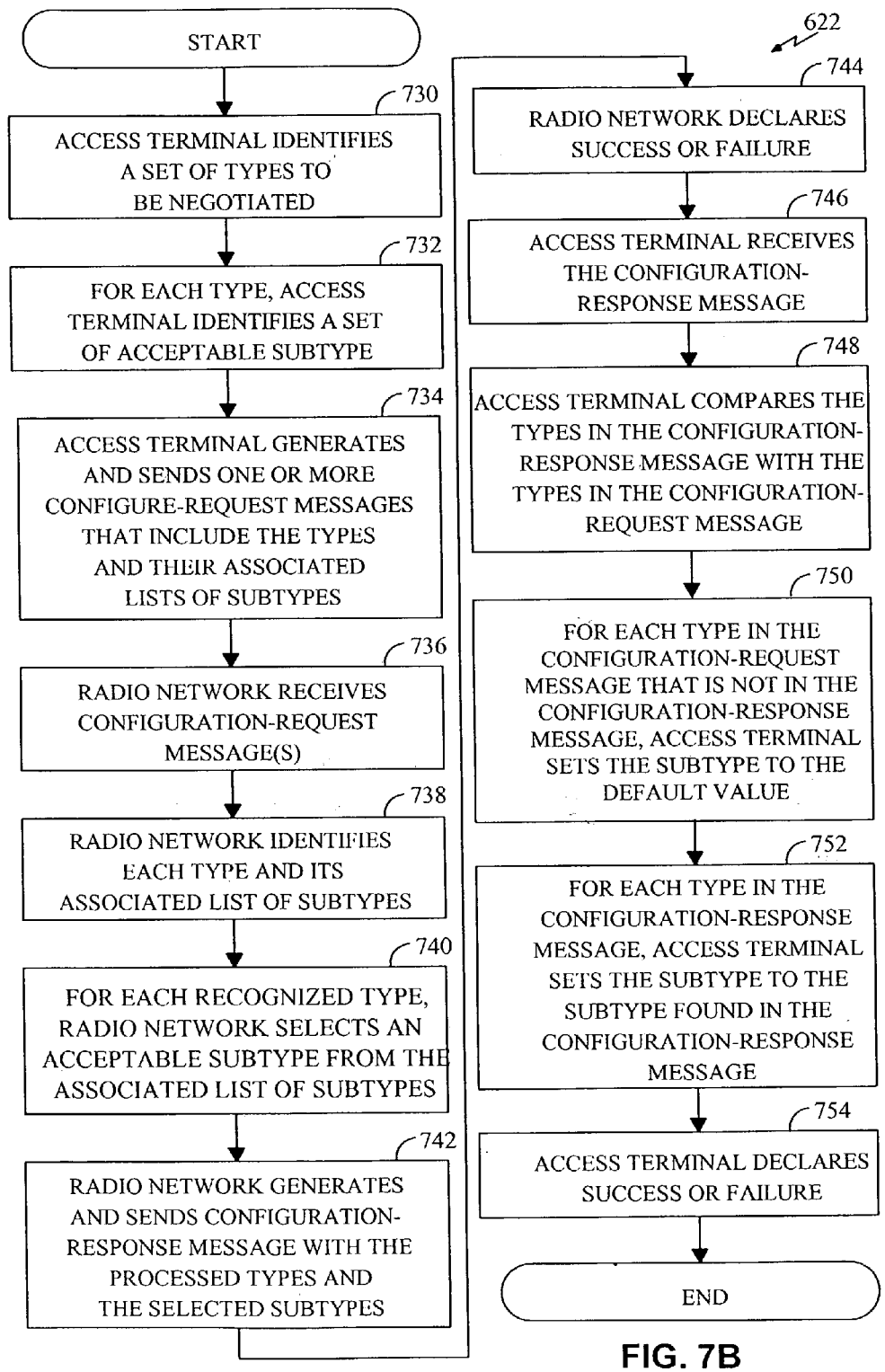
FIGS. 7B and 7C show flow diagrams of a specific implementation of a session layer/protocol negotiation sub-phase and a session layer/protocol activation sub-phase, respectively.

FIG. 7B shows a flow diagram of a specific implementation of session layer/protocol negotiation sub-phase 622. The protocol in sub-phase 622 uses one or more configuration-request messages and configuration-response messages to allow the access terminal and radio network to negotiate mutually acceptable layers, protocols, and configurations.

Initially, the access terminal identifies a set of layers and protocols (or layers/protocols, which are identified by their Types) to be negotiated, at block 730. For each selected layers and protocols, the access terminal identifies a set of acceptable configurations (which are identified by their Subtypes), at block 732. The access terminal then generates and sends one or more configuration-request messages over the reverse dedicated channel to the radio network, at block 734.

Each configuration-request message includes one or more Types that identify the corresponding one or more layers/protocols to be negotiated. For each Type, the message further includes a list of one or more acceptable Subtypes, in descending order of preference. In an embodiment, to simplify message processing, each configuration-request message includes one or more complete and ordered Subtype lists (i.e., a Subtype list is not split within a configuration-request message and not split across multiple configuration-request messages).

The radio network receives the configuration-request message(s), at block 736, and identifies each Type and its associated list of Subtypes, at block 738. For each recognized Type in the configuration-request message, the radio network selects an acceptable Subtype from the associated list of Subtypes previously identified by the access terminal to be acceptable, at block 740. If the radio network does not recognize the Type or does not find an acceptable Subtype in the associated list, that Type is skipped. The radio network then generates and sends a configuration-response message that includes the Type(s) processed by the radio network and the Subtype selected for each Type, at block 742. Any Type skipped by the radio network is omitted from the configuration-response message. In an embodiment, to simplify processing by the access terminal, the Type(s) in the configuration-response message are arranged in the same order found in the configuration-request message.

The access terminal receives the configuration-response message, at block 746, and compares the Type(s) in the configuration-response message with the Type(s) in the configuration-request message, at block 748. For each Type in the configuration-request message that is not found in the configuration-response message, the access terminal set the Subtype for the Type to the default value, at block 750. For each Type in the configuration-response message, the access terminal sets the Subtype for the Type to the associated Subtype found in the received configuration-response message, at block 752.

In an embodiment, the radio network declares a configuration failure, at block 744, if it determines at any time during the message exchange that the Types or Subtypes selected by the access terminal will not operate.

In an embodiment, the access terminal declares a configuration failure, at block 754, if it determines at any time during the message exchange that:
1) the received configuration-response message has no associated configuration-request message,
2) the configuration-response message includes multiple attribute values (i.e., multiple Subtypes) for one attribute (i.e., Type),
3) the configuration-response message includes an attribute not found in the associated configuration-request message,
4) the configuration-response message includes an attribute value not found in the configuration-request message,
5) the configuration-response message includes an attribute in an order that is different from the order in the associated configuration-request message, or
6) the configurations selected by the radio network will not operate.

Configuration failure can also be declared by the access terminal and radio network based on some other conditions.

If a configuration failure is declared, the party declaring the failure closes the session. The close-Type and close-Subtype are set to the Type and Subtype, respectively, of the link layer protocols. In an embodiment, if the access terminal and radio network are not able to agree on the configuration for one or more session layers/protocols, the session is closed.

Once session layer/protocol negotiation sub-phase 622 for a particular layer/protocol is completed, the access terminal and radio network enter session layer/protocol configuration sub-phase 624 for that layer/protocol. In sub-phase 624, the access terminal and radio network determine the configuration of the layers and protocols negotiated during session layer/protocol negotiation sub-phase 622. The messages for sub-phase 624 are carried by their respective layer/protocol Types.

The session layer/protocol configuration sub-phases for the one or more selected layers/protocols can be performed serially, or in parallel to speed up the configuration process. For improved compatibility, the radio network can be designed to support both serial and parallel configuration, and the access terminal can be designed to support either serial or parallel configuration, or possibly both.

The implementation of configuration sub-phase 624 is dependent on the particular layer/protocol to be configured. Various implementations of configuration sub-phase 624 can be contemplated and are within the scope of the present invention.

Figure 7C:
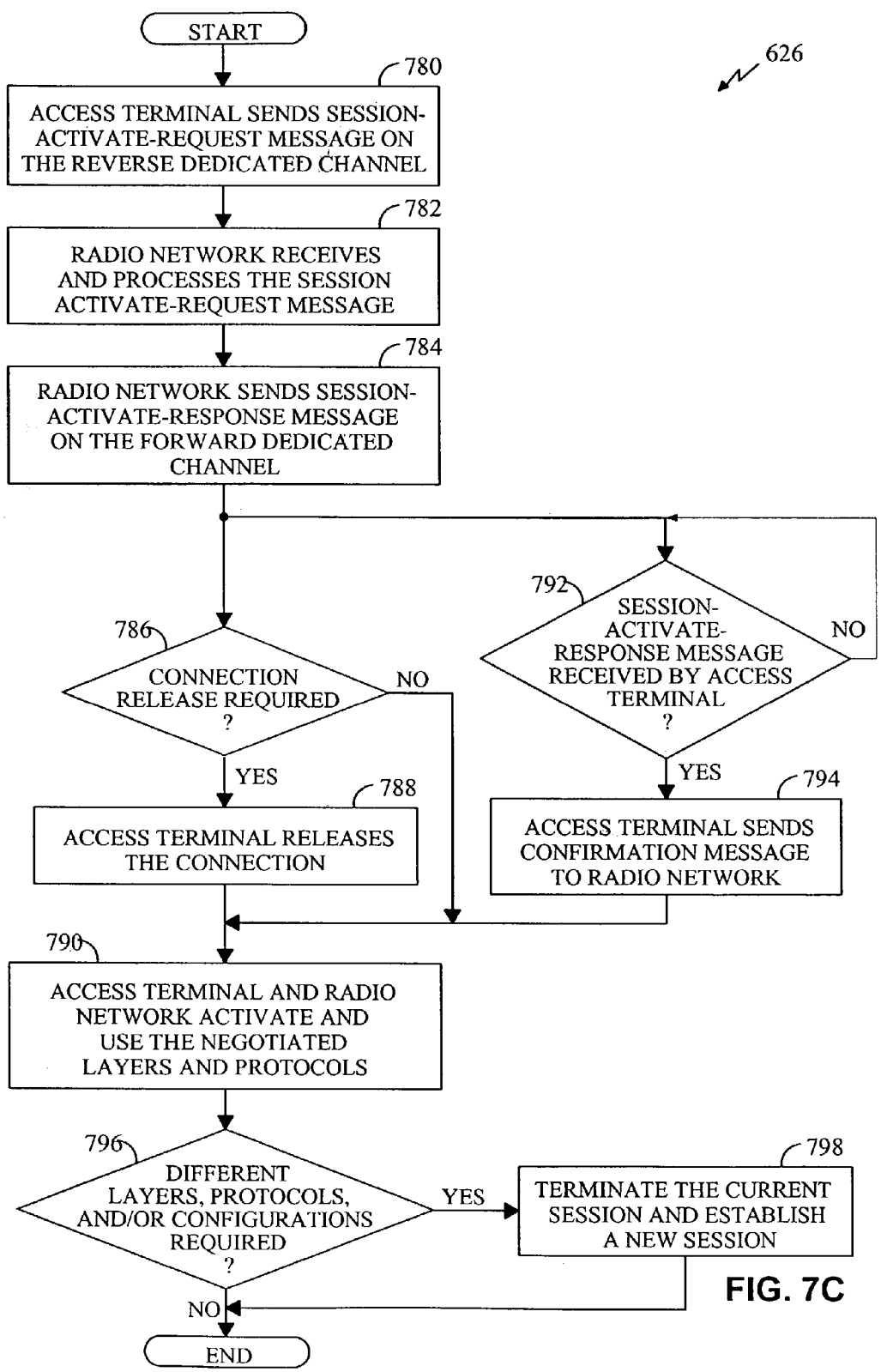

FIG. 7C shows a flow diagram of an embodiment of session layer/protocol activation sub-phase 626. Upon completion of session layer/protocol configuration sub-phase 624 for all negotiated layers and protocols, the access terminal and radio network enter session layer/protocol activation sub-phase 626. In sub-phase 626, the access terminal and radio network activate the negotiated session layers and protocols. The messages in sub-phase 626 are carried by the session protocol.

In an embodiment, the access terminal initiates activation sub-phase 626 by sending a session-activate-request message on the reverse dedicated channel, at block 780. If the access terminal requires the release of the connection in order to activate the negotiated layers and protocols, it indicates this requirement in the session-activate-request message. The radio network receives and processes the message, at block 782. The radio network then sends a session-activate-response message on the forward dedicated channel, at block 784. If a connection release is required, the radio network indicates this requirement in the session-activate-response message.

At block 786, a determination is made whether the access terminal or radio network requires the release of the connection in order to activate the negotiated layers and protocols. If a connection release is required, the access terminal releases the connection, at block 788. Upon release of the connection, the access terminal and radio network activate and use the negotiated layers and protocols, at block 790. Alternatively, a determination can be made whether the session-activate-response message is received by the access terminal, at block 792. If the session-activate-response message is received, the access terminal and radio network activate and use the negotiated layers and protocols. The access terminal send an confirmation message back to the radio network upon receiving the session-activate-response message at block 794.

During the session, if it is determined that different layers, protocols, and/or configurations are required, at block 796, the current session is terminated and a new session is established, at block 798.

In an embodiment, session layer/protocol negotiation sub-phase 622 can be performed for all selected layers and protocols and, thereafter, session layer/protocol configuration sub-phase 624 is performed for each selected layer and protocol. Alternatively, session layer/protocol negotiation sub-phase 622 can be performed for a particular number of selected layers and protocols (e.g., one layer or protocol) followed thereafter by session layer/protocol configuration sub-phase 624 for the selected layers and protocols (e.g., the negotiation and configuration sub-phases are performed as a combination for each layer and protocol).

Figure 8:
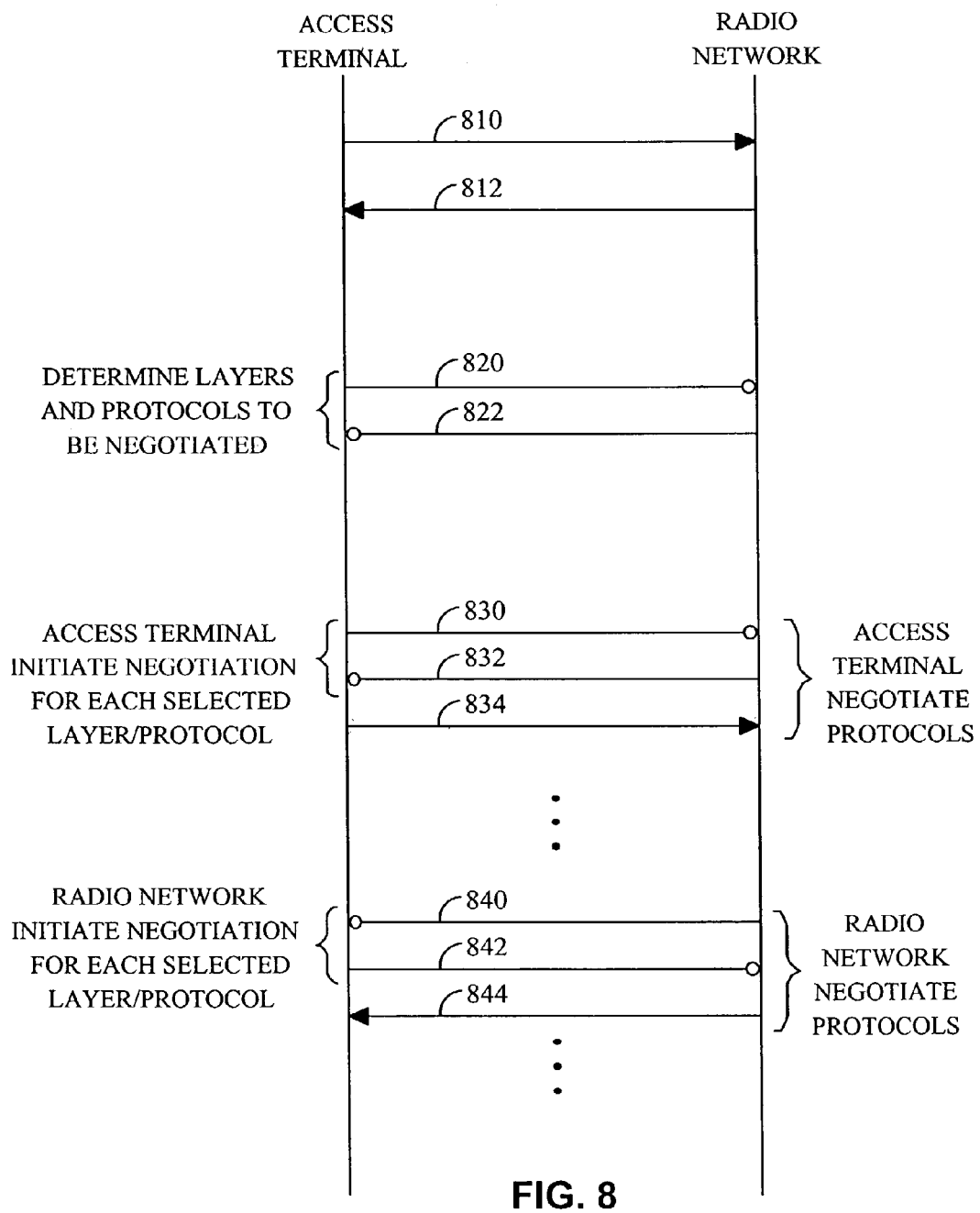
FIG. 8 shows a time diagram of an embodiment of the session layer/protocol negotiation and configuration sub-phases initiated by an access terminal.

FIG. 8 shows a message flow diagram of a specific implementation of session layer/protocol negotiation sub-phase 622 and session layer/protocol configuration sub-phase 624 initiated by an access terminal to establish a communication link with a radio network. The access terminal initiates the session negotiation by sending an open-request message 810 to the radio network via a common channel (e.g., access channel 444 in FIG. 4, or an access channel in an IS-95 compliant system). The open-request message includes a message identifier and a transaction identifier that identify the message and transaction, respectively, to the radio network. The radio network receives and processes the open-request message and sends an open-response message 812 back to the access terminal. The open-response message includes the message and transaction identifiers, a result-code corresponding to the result of the open request, and an access terminal identifier if the request is accepted.

The access terminal and radio network then determine the layers and protocols to be negotiated. This can be achieved via an exchange of messages 820 and 822 between the access terminal and radio network on the assigned forward and reverse traffic channels (e.g., forward traffic channel 426 and reverse traffic channel 442 in FIG. 4). Multiple messages can be sent by the access terminal and radio network. The message(s) sent by the access terminal are symbolically represented as message 820 in FIG. 8 and the message(s) sent by the radio network are symbolically represented as message 822.

In an embodiment, the open-request and open-response messages are sent via the common channels (e.g., the access channel and the control), which are shared with other access terminals, but the negotiation and configuration messages are sent via the dedicated channels assigned by the radio network. The open-request and open-response messages are designed to be short. The negotiation and configuration messages are typically more extensive, and are sent via the assigned dedicated channels for improved performance (i.e., shorter response time).

Once the layers and protocols are selected, negotiation is thereafter performed for each selected layer and protocol. In an embodiment, the layers and protocols selected by one entity (e.g., the access terminal) are negotiated first and the layers and protocols selected by the other entity (e.g., the radio network) are then negotiated. The entity negotiating a particular layer or protocol sends to the other entity a configuration-request message 830 (or 840) that includes one or more selected layers and/or protocols and a list of acceptable configurations for each selected layer and protocol. (The layers and protocols being negotiated are also referred to as attributes, and the configurations are also referred to as attribute values.) The other entity receives the configuration-request message(s) and responds with corresponding configuration-response message(s) 832 (or 842) that include the layers and/or protocols being negotiated and their selected configurations. The exchange of configuration request/response messages continues until both entities accept the negotiated attributes. A confirmation message 834 (or 844) is then sent by the entity that initiates negotiation to confirm acceptance of the negotiated attribute. Additional selected attributes, if any, are then negotiated in the similar manner.

In FIG. 8, negotiation messages 830 and 832 and confirmation message 834 represent the messages for one set of attributes (i.e., one layer, one protocol, and so on). Another set of messages is sent for each set of attributes selected for negotiation. In the embodiment shown in FIG. 8, negotiation messages 840 and 842 and confirmation message 844 for the set of attributes selected for negotiation by the radio network are exchanged after the attributes selected by access terminal have been negotiated.

Upon completion of the protocol negotiation, communication between the access terminal and radio network can be performed using the negotiated layers and protocols.

In accordance with an aspect of the invention, the access terminal and radio network are designed to support a basic set of messages. In an embodiment, the access terminal and radio network support the messages listed in Table 1, which are further described below.

TABLE 1

| Message | Identifier | Channel |
| --- | --- | --- |
| open-request | 0x00 | common |
| open-response | 0x01 | common |
| Close | 0x02 | common |
| Hello | 0x03 | common and dedicated |
| configuration-request | 0x04 | dedicated |
| configuration-response | 0x05 | dedicated |
| configuration-activate-request | 0x06 | dedicated |
| configuration-activate-response | 0x07 | dedicated |

FIG. 9A is a diagram of an embodiment of a format for the open-request message. In this embodiment, the open-request message includes a message-identifier field 910 and a transaction-identifier field 912. In an embodiment, message-identifier field 910 is an 8-bit field having a value of 0x00 that identifies the open-request message, and transaction-identifier field 912 is also an 8-bit field having a value that is incremented with each new open-request message sent.

FIG. 9B is a diagram of an embodiment of a format for the open-response message. In this embodiment, the open-response message includes a message-identifier field 920, a transaction-identifier field 922, a result-code field 924, an access-terminal-identifier field 926, and a session-inactivity-timer field 928. In an embodiment, message-identifier field 920 is an 8-bit field having a value of 0x01 that identifies the open-response message, and transaction-identifier field 964 is also an 8-bit field containing the value from transaction-identifier field 912 in the corresponding received open-request message being processed. In an embodiment, result-code field 924 is an 8-bit field having a value of 0x00 if the open request is accepted, a value of 0x01 if the open request is rejected for an unspecified reason, and a value of 0x02 if the open request is rejected because of lack of resources. Additional or different values for result-code field 924 can also be generated.

In an embodiment, access-terminal-identifier field 926 is a 4-octet field having a value assigned as the access terminal identifier to be used by the access terminal for the duration of the session. If the value in result-code field 924 is 0x00, then access-terminal-identifier field 926 is set to 0x00000000 and the access terminal ignores this value. In an embodiment, session-inactivity-timer field 928 is an 8-bit field having a value indicative of the length of inactivity, in minutes, of the session. If the value in result-code field 924 is 0x00, indicating the acceptance of the open request, then the radio network sets the value in session-inactivity-timer field 928 to a value from a session inactivity timer that is used for the session. If the value in result-code field 924 is not 0x00, indicating the rejection of the open request, then session-inactivity-timer field 928 is set to 0x00 and the access terminal ignores this value.

FIG. 9C is a diagram of an embodiment of a format for the close message. In this embodiment, the close message includes a message-identifier field 930, a transaction-identifier 932, a close reason field 934, a more info len field 936, and a more info field 938. In an embodiment, message-identifier field 930 is an 8-bit field having a value of 0x02 that identifies the close message and transaction-identifier field 932 is also an 8-bit field having a value that is incremented with each new close message sent. In an embodiment, close reason field 934 is a 1-octet field having a value that identifies the reason for the close, more info len field 936 is a 1-octet field having a value that identifies the length (in octets) of the subsequent more info field 938, and more info field 938 is a variable length field containing additional information pertaining to the closure. The format for more info field 938 is dependent on the particular closure.

FIG. 9D is a diagram of an embodiment of a format for the hello message. In this embodiment, the hello message includes an 8-bit message-identifier field 940 having a value of 0×03 that identifies the hello message.

FIG. 9E is a diagram of an embodiment of a format for the configuration-request message. In this embodiment, the configuration-request message includes a type field 950, a message-identifier field 952, a transaction-identifier field 954, and an attribute-list field 956. In an embodiment, type field 950 is an 8-bit field having a value that identifies the type of the protocol being configured, message-identifier field 952 is an 8-bit field having a value of 0×04 that identifies the configuration-request message, and transaction-identifier field 954 is also an 8-bit field having a value that is incremented with each new configuration-request message sent. In an embodiment, attribute-list field 956 is a variable length field that includes a list of acceptable Subtypes for each Type to be negotiated, with each list element including one or more (Type, Subtype) pairs. In an embodiment, if a list includes more than one element, then the elements are arranged in descending order of preference. The receiving entity can determine the length of the configuration-request message by using the length of the message.

FIG. 9F is a diagram of an embodiment of a format for the configuration-response message. In this embodiment, the configuration-response message includes a type field 960, a message-identifier field 962, a transaction-identifier field 964, and an attribute-list field 966. In an embodiment, type field 960 is an 8-bit field having a value that identifies the type of the protocol being configured, message-identifier field 962 is an 8-bit field having a value of 0×05 that identifies the configuration-response message, and transaction-identifier field 964 is also an 8-bit field containing the value from transaction-identifier field 954 in the received configuration-request message being processed.

In an embodiment, attribute-list field 966 is a variable length field that includes one (or possibly more) acceptable Subtype for each processed Type. The elements in attribute-list field 966 are (Type, Subtype) pairs. Attribute-list field 966 does not contain an element not found in the corresponding configuration-request message, and the elements in attribute-list field 966 are arranged in the order found in the corresponding configuration-request message. Again, the receiving entity can determine the length of the configuration-response message by using the length of the message.

FIG. 9G is a diagram of an embodiment of a format for the session-activate-request message. In this embodiment, the session-activate-request message includes a message-identifier field 970, a transaction-identifier field 972, and a connection-release-indication field 974. In an embodiment, message-identifier field 970 is an 8-bit field having a value of 0×06 that identifies the session-activate-request message, and transaction-identifier field 972 is also an 8-bit field having a value that is incremented with each new session-activate-request message sent. In an embodiment, connection-release-indication field 974 is a 1-octet field having a value of 0×01 if the access terminal requires the connection to be released in order to transition to the session layer/protocol negotiation or configuration sub-phase, and a value of 0×00 otherwise.

FIG. 9H is a diagram of an embodiment of a format for the session-activate-response message. In this embodiment, the session-activate-response message includes a message-identifier field 980, a transaction-identifier field 982, and a connection-release-indication field 984. In an embodiment, message-identifier field 980 is an 8-bit field having a value of 0×07 that identifies the session-activate-response message, and transaction-identifier field 982 is also an 8-bit field containing the value from transaction-identifier field 972 in the received session-activate-request message being processed. In an embodiment, connection-release-indication field 984 is a 1-octet field having a value of 0×01 if either the access terminal or radio network requires the connection to be released in order to transition to the session layer/protocol negotiation or configuration sub-phase, and a value of 0×00 otherwise.

FIGS. 9A through 9H show diagrams of a specific implementation of some of the messages that can be used for the configuration of applications, layers, and protocols. Additional and/or different messages than those described above can also be defined and used (e.g., an activate message, a configuration complete message, and many others), and this is within the scope of the present invention. Moreover, the messages can be designed to have different (or additional) message formats, fields, and field formats than those shown in FIGS. 9A through 9H, and this is also within the scope of the present invention.

The invention provides numerous advantages. First, the modular design of the layers and protocols allows for easy modification and upgrade of the communication system to support new features and functionality. The access terminal and radio network can communicate using the layers and protocols commonly supported by both, and this determination can be made at the time a session is opened. Second, the basic set of layers and protocols supported by the access terminals and radio networks ensures a minimum level of compatibility among the access terminals and radio networks. For a radio network to be forward compatible with this signaling protocol, it only needs to implement a limited set of functionality. For example, the radio network only needs to be able to send an empty configuration-response message in response to a received configuration-request message. Thus, the signaling protocol of the invention allows for easy implementation of future configurations even if no current configuration is needed.

The invention can be implemented in various manners, and can be implemented in software, hardware, or a combination thereof. For example, referring back to FIG. 2, the invention can be implemented by a combination of software and/or hardware within control system 214 and controller 262, or other units coupled to control system 214 and controller 262. The hardware can be implemented in one or more integrated circuits, an application specific integrated circuit (ASIC), a digital signal processor (DSP), a controller, a microprocessor, or other circuits designed to perform the functions described herein.

The invention described herein can be applied to many spread spectrum communications systems. The invention is applicable to spread spectrum systems that currently exist and new systems that are continually being considered. A specific CDMA system is described in the aforementioned U.S. patent application Ser. No. 08/963,386. Another CDMA system is disclosed in the aforementioned U.S. Pat. Nos. 4,901,307 and 5,103,459.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for configuring a layer or protocol prior to commencement of data communication by a first entity, the apparatus comprising:
    means for selecting at the first entity a set of one or more layers and one or more protocols to be negotiated, wherein each selected layer and protocol corresponds to an attribute to be negotiated between the first entity and a second entity;
    means for determining, for each attribute, a list of selected attribute values that includes one or more attribute values considered acceptable to the first entity;
    means for sending from the first entity a list of selected attributes and their associated lists of selected attribute values;
    means for receiving at the first entity the list of processed attributes and their associated lists of the processed attribute values, wherein each list of processed attribute values includes one or more attribute values considered acceptable to the second entity; and
    means for configuring the selected set of one or more layers and one or more protocols in the first entity in accordance with the received list of the processed attributes and their associated lists of the processed attribute values.

2. The apparatus of claim 1, wherein elements in each list of the selected attribute values are arranged in an order based on preference of the first entity.

3. The apparatus of claim 1, wherein each processed attribute value is associated with one processed attribute value.

4. The apparatus of claim 1, wherein the layers and protocols in the first entity are configured with their default values if corresponding processed attribute values are not received at the first entity.

5. The apparatus of claim 1, wherein the sending and receiving are achieved via dedicated communications channels.

6. The apparatus of claim 1, wherein the first entity or the second entity, or both, implements a state machine having a plurality of states including:
    an inactive state indicative of inactivity prior to a session negotiation,
    an initiated state indicative of the session negotiation over the list of the selected attributes, and
    an open state indicative of active communication between the first entity and the second entity.

7. The apparatus of claim 6, wherein the initiated state includes:
    an access terminal initiated state indicative of the session negotiation over attributes selected by the first entity, and
    a radio network initiated state indicative of the session negotiation over attributes selected by the second entity.

8. The apparatus of claim 1, wherein the list of the selected attributes and their associated lists of the selected attribute values are sent from the first entity via one or more configuration-request messages.

9. The apparatus of claim 1, wherein the set of the processed attribute values and their associated lists of the processed attribute values are received at the first entity via one or more configuration-response messages.

10. The apparatus of claim 1, wherein the processed attribute values and their associated lists of the processed attribute values are received in an order corresponding to an order of the selected attributes and their associated lists of the selected attribute values.

11. The apparatus of claim 1, wherein the communication between the first entity and the second entity occurs via default layers and protocols prior to completion of configuration of the selected set of one or more layers and one or more protocols in the first entity.

12. The apparatus of claim 1, further comprising:
    means for receiving an entity identifier at the first entity, and
    wherein subsequent messages sent from the first entity are identified by the entity identifier.

13. The apparatus of claim 1, wherein the first entity and the second entity each selects a set of attributes to be negotiated, and wherein the negotiation of the set of attributes selected by the first entity is completed prior to the negotiation of the set of attributes selected by the second entity.

14. The apparatus of claim 1, wherein the first entity is an access terminal.

15. The apparatus of claim 1, wherein the second entity is a radio network.

16. The apparatus of claim 1, further comprising:
    means for sending from the first entity an open-request message indicative of a request to open a communications session; and
    means for receiving at the first entity an open-response message indicative of an acceptance or rejection of the request to open the communications session.

17. The apparatus of claim 16, wherein the open-request message and the open-response message are sent and received via common communications channels.

18. An apparatus for providing configurable layers or protocols, or both, in a communications system, the apparatus comprising:
    means for maintaining a set of default layers and protocols for use at a first entity to communicate with a second entity;
    means for maintaining a set of one or more configurable layers and one or more configurable protocols, or a combination thereof, wherein each configurable layer and protocol corresponds to an attribute that can be negotiated between the first entity and the second entity;
    means for providing a set of configuration messages used for sending and receiving configuration information related to each attribute; and
    means for providing a state machine indicative of a communications state of the first entity.

19. The apparatus of claim 18, wherein the configuration messages are implemented at a session layer of the communications system.

20. The apparatus of claim 18, wherein the set of default layers and protocols includes an overhead protocol for sending and receiving messages that support negotiation and configuration of a set of configurable attributes.

21. The apparatus of claim 18, wherein the state machine includes:
- an inactive state indicative of inactivity prior to a session negotiation,
- an initiated state indicative of the negotiation over one or more of the attributes, and
- an open state indicative of active communication between the first entity and the second entity.

22. The apparatus of claim 18, wherein each configuration message includes an entity identifier that identifies the first entity.

23. The apparatus of claim 18, wherein each configuration message includes a transaction identifier that identifies a particular instance of the configuration message.

* * * * *